United States Patent [19]

Dickinson

[11] Patent Number: 4,823,517
[45] Date of Patent: Apr. 25, 1989

[54] DRIP STOP SPACER FOR GREENHOUSES

[76] Inventor: James M. Dickinson, P.O. Box 145, Surry, Me. 04684

[21] Appl. No.: 104,964

[22] Filed: Oct. 6, 1987

[51] Int. Cl.$^4$ ............................................. A01G 9/14
[52] U.S. Cl. ......................................... 52/39; 47/17; 135/119; 248/317
[58] Field of Search .............. 47/17; 135/119; 52/147; 248/340, 317

[56] References Cited

U.S. PATENT DOCUMENTS

| | | | |
|---|---|---|---|
| 2,595,094 | 4/1952 | Niles | 135/87 |
| 3,936,913 | 2/1976 | Weisman | 248/340 |
| 4,577,436 | 3/1986 | Dalle | 47/17 |

FOREIGN PATENT DOCUMENTS 657111  4/1958  Canada .................................. 52/147

Primary Examiner—John E. Murtagh
Attorney, Agent, or Firm—Daniel H. Kane, Jr.

[57] ABSTRACT

A drip stop spacer spaces a roof or wall covering such as sheet plastic from purlins or other frame members of a greenhouse. An elongate elastic cylindrical helix is formed of a length of helical chord of flexible material with chord depth dimension in the radial direction of the helix selected to achieve a desired spacing between a covering and frame members. The helix diameter is sufficient to place the helix in turns around the frame members with lead or pitch between turns of the helix selected to prevent sagging contact of the covering against frame members. The spacer elements can be installed by twisting or winding around the purlins without requiring removal of frame members. Condensation flowing down the covering bypasses the purlins and purlin dripping is avoided.

13 Claims, 2 Drawing Sheets

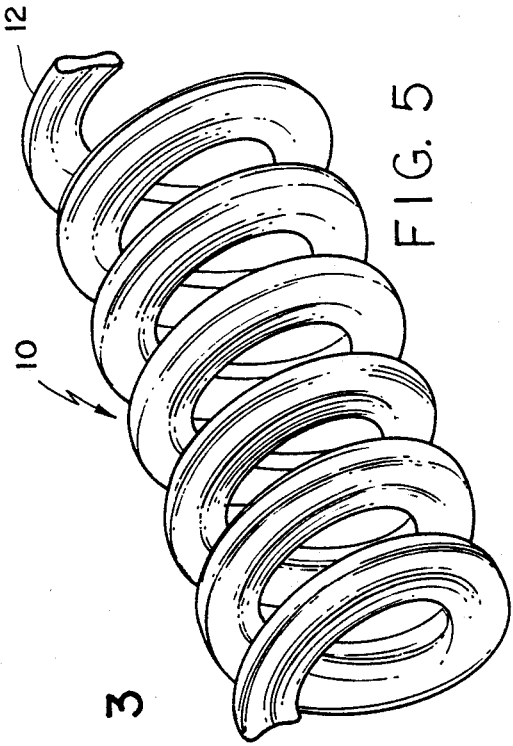
FIG. 2
FIG. 5
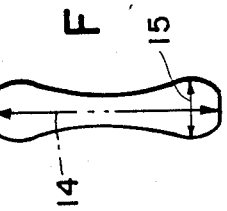
FIG. 3
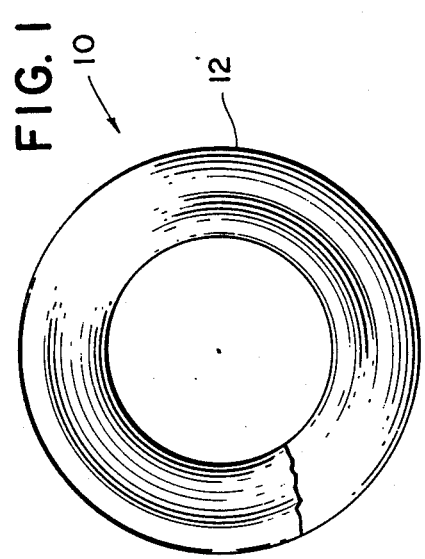
FIG. 1
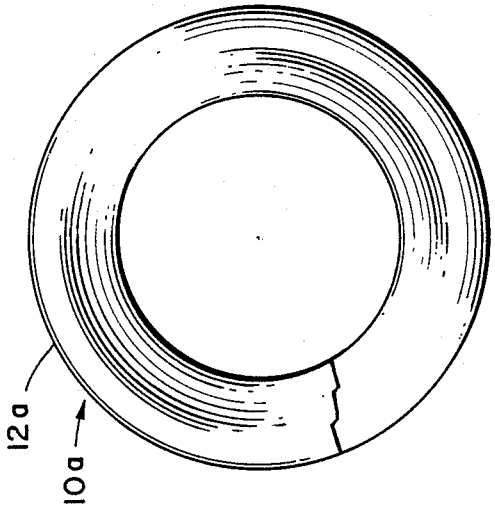
FIG. 4

DRIP STOP SPACER FOR GREENHOUSES

TECHNICAL FIELD

This invention relates to a new spacer or spacing element for spacing a greenhouse covering such as sheet plastic from greenhouse frame members. The invention is particularly applicable to quonset style greenhouses for spacing the sheet plastic covering from greenhouse frame purlins to prevent dripping from the purlins of condensation flowing down the sheet plastic covering.

BACKGROUND ART

Quonset type greenhouses are typically constructed with a horizontal ridge pole at the top along the center of the greenhouse with at least two parallel purlins or purlin frame members spaced apart on each side of the center ridge pole. Additional purlins may be added for hanging baskets, increased greenhouse size, etc. The purlins are generally round galvanized steel or aluminum tubes or conduits in unit lengths, for example 20 feet (6 m) long, joined together. The quonset frame members and purlins are covered with one or more layers of sheet plastic such as polyethylene plastic for the "greenhouse effect" covering. The inner covering or skin rests with direct contact on the purlins. The greenhouse is typically heated to 60° to 70° F. (15°–21° C.) inside.

In northern climates with outside temperatures down to 40° F. (5° C.) and lower, condensation becomes a major factor. Moisture from the high humidity inside the greenhouse condenses on the inside surface of the covering and flows down the inclined walls. Anti-beading water-repellent coating such as "Sunclear" (TM) coating on the plastic sheet covering prevents water from beading and enhances the flow. The condensation flowing down the walls encounters the purlins. Continuous dripping from the purlins presents a widespread problem.

OBJECTS OF THE INVENTION

It is therefore a object of the present invention to provide a new greenhouse structure which substantially eliminates purlin dripping.

Another object of the invention is to provide a new spacer or spacing element for spacing a greenhouse covering from purlins or other frame members so that condensation on the covering can flow harmlessly by the purlins for dissipation at the sides of the greenhouse.

A further object of the invention is to provide greenhouse frame member spacers or spacing elements to prevent purlin drip which can be assembled or retrofitted onto the purlins or other frame members either before or after the greenhouse is assembled and without requiring removal of frame members.

DISCLOSURE OF THE INVENTION

In order to accomplish these results the present invention provides a drip stop spacer for spacing a roof or wall covering from purlins or other frame members. An elongate elastic cylindrical helix is provided, formed for example by molding a length of helical chord or line of flexible material. The chord or line is formed with a depth thickness or diameter to achieve the desired spacing between a covering and frame members. The helix diameter is sufficient to place the helix in turns around the frame members with a lead or pitch between turns of the helix selected to prevent sagging contact of the covering against frame members.

A feature and advantage of this arrangement is that separate helical lengths of the spacing elements can be twisted or wound on the purlins after a greenhouse is assembled with the covering in place, without the necessity of removing the frame members. The helical lengths space the covering so that condensation flows by the purlins to be dissipated at the sides of the greenhouse without purlin drip.

The greenhouse structure of the present invention incorporating the spacer elements effectively eliminates 80 to 90% and more of the purlin dripping. In the preferred embodiment, the chord or line of the helix is formed with a depth dimension greater than width to minimize contact with the covering. However, the spacer element helical lengths may be formed in a variety of dimensions, configurations and materials. Other objects, features and advantages of the invention are set forth in the following specification and accompanying drawings.

BRIEF DESCRIPTION OF THE DRAWINGS

FIG. 1 is an end view looking into a helical spacer element.

FIG. 2 is a fragmentary side view of a portion of the helical length of a spacing element.

FIG. 3 is an enlarged cross section of the flexible chord forming the helix showing a preferred configuration of depth dimension exceeding width dimension.

FIG. 4 is an end view of a larger dimension spacer element.

FIG. 5 is fragmentary perspective view of a portion of the helical length of a spacer element.

DESCRIPTION OF PREFERRED EXAMPLE EMBODIMENTS & BEST MODE OF THE INVENTION

Figure 6:
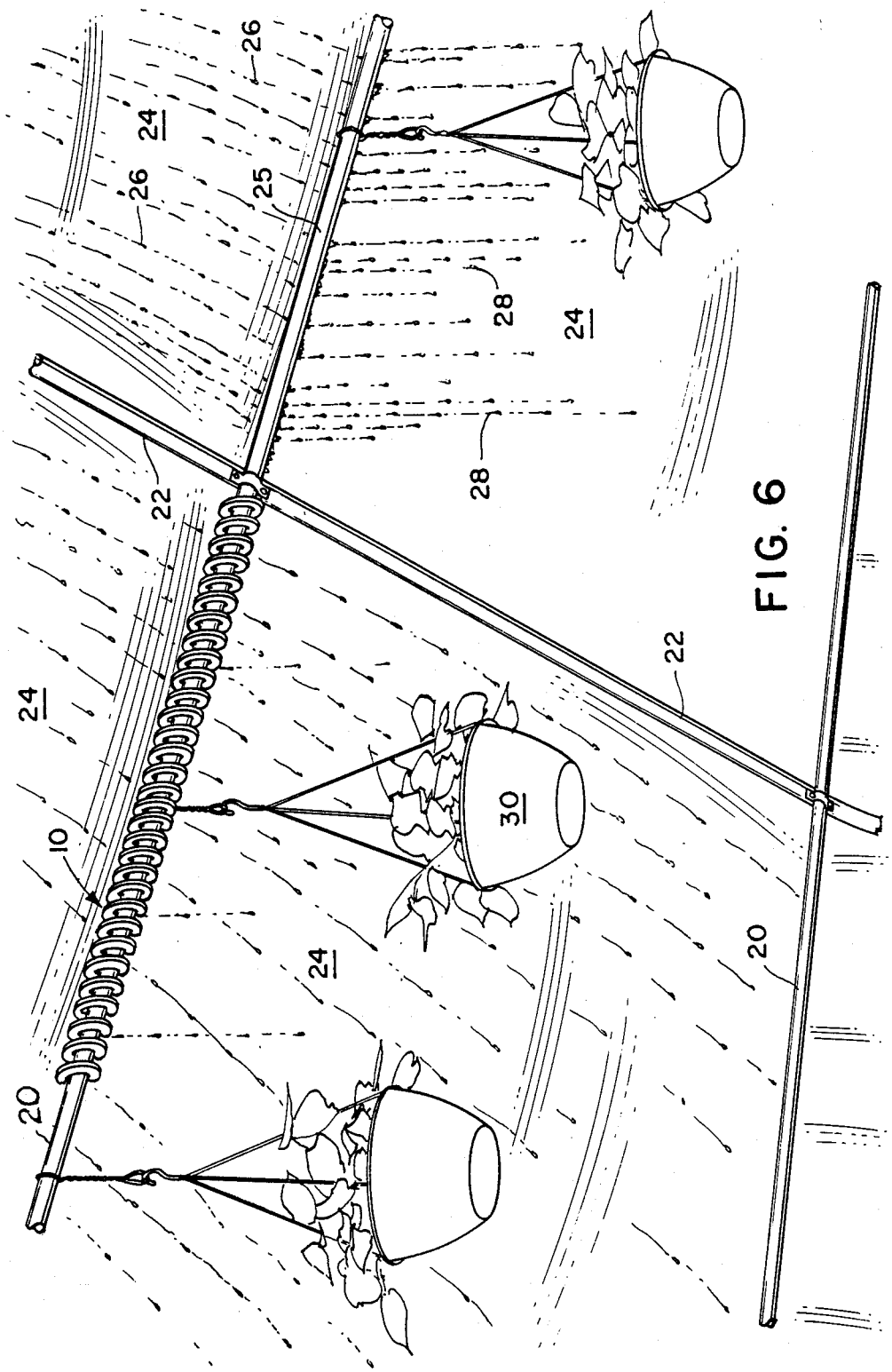
FIG. 6 is a fragmentary perspective view of a portion of a greenhouse structure according to the invention compared side-by-side with a conventional greenhouse structure.

A spacer element 10 according to the invention is illustrated in FIGS. 1–5. The spacer element 10 is an elongate cylindrical elastic helix formed by a length of helical chord 12. The chord 12 is formed of flexible material such as polypropylene plastic and molded so that it retains its elastic helix configuration. The chord 12 is shown in cross section in FIG. 3 in a preferred cross sectional shape or configuration with chord depth thickness or dimension 14 greater than the width dimension 15 in this example by a factor of 3 or greater. The "hour-glass" like configuration indented at the center and wider at the top and bottom conserves material expense while retaining material strength, and increases flexibility of the helix for twisting or winding onto a purlin.

The spacer element or helical length may be formed in a variety of sizes with helical diameter varying according to the diameter of the purlins. A larger diameter spacer element 10a formed by flexible material chord 12a is illustrated in FIG. 4. The chord itself may be any of a variety of cross sectional configurations other than the preferred cross section of FIG. 3, for example round, elliptical, or rectangular.

Individual lengths of the spacer elements may be twisted or wound onto purlins 20 to form the greenhouse structure of the invention as shown in FIG. 6. As illustrated in FIG. 6, the purlins are the horizontal or longitudinal frame elements. Separate lengths permit convenient installation at desired locations on the frame members for example enfolding or surrounding purlins 20 between bows 22 of the frame. Only one such helical length or spacer element is shown in the example of FIG. 6 on the upper left hand purlin. The spacer elements are installed or retrofitted in an assembled greenhouse by twisting or winding around the purlin. They may of course be installed prior to assembly or during assembly of the greenhouse by simply sliding over the ends of the purlins.

Conventional construction with contact of the sheet plastic cover 24 resting with direct contact against purlin 25 permits condensation flow 26 to collect at purlin 25 producing continuous heavy purlin dripping as shown in FIG. 6 on the upper right hand purlin. In contrast, the purlin drip at the portion of cover 24 resting on the spacer element 10 is reduced by a factor of approximately 90%.

A further feature of the invention is also shown in FIG. 6. The helical loops or turns of spacing element 10 may be used for supporting hanging baskets 30 hanging directly from the loops or turns. Another advantage of the helical configuration spacing element is that as the helix is manually expanded or contracted to a desired length and pitch, substantially equal spacing is automatically maintained between the loops or turns by the elasticity molded into the helix.

According to one example, a spacer element of the configuration of FIGS. 1-5 was constructed with a chord width dimension 15 of approximately 3/16" (4.8 mm); helical length and pitch with approximately 19 loops or turns over a 4 foot (1.2 m) length; and an internal helix diameter of approximately 1¼ to 1½ inches (3 to 3.8 cm). The total surface length contact of the cover over the 4 foot (1.2 m) length with the spacer element is therefore approximately 3 ½" (8.75 cm). Surface contact by the cover along the length of the purlin is therefore reduced to only 7% of the conventional greenhouse construction contact, reducing purlin drip by over 90%. In other words, the surface contact by the cover on either the horizontal purlin or the spacer element is reduced to less than 10% of the width of the covering along the length of the purlin. Over 90% of the width of the covering along the horizontal purlin is free of contact with the horizontal purlin and spacing element.

While the invention is described with reference to particular example embodiments, it is intended to cover all modifications and equivalents within the scope of the following claims.

I claim:
1. A drip stop spacer for spacing a roof or wall covering from purlins or other frame members comprising:
an elongate cylindrical helix comprised of a length of helical chord of flexible material having a chord depth dimension in the radial direction of the helix selected to achieve a desired spacing and being formed with a helix diameter sufficient to place the helix in turns around the frame members with desired lead or pitch spacing between turns of the helix and without requiring removal of frame members, said chord being formed with an elongate "hour-glass" like cross sectional configuration oriented in the depth direction and narrower in the middle and wider at the top and bottom.

2. The drip stop spacer of claim 1 wherein the chord is formed with a depth dimension greater than the maximum width.

3. The drip stop spacer of claim 2 wherein the depth dimension of the chord is at least three times the maximum width of the chord.

4. The drip stop spacer of claim 1 wherein the elongate cylindrical helix is an elastic helix molded from flexible plastic material.

5. A drip stop spacer and frame structure for spacing a roof or wall covering from purlins or other frame members of a frame comprising:
a frame comprising horizontal purlins;
an elongated chord of flexible material wound in a helix around a horizontal purlin of the frame with a lead or pitch spacing between turns of the helix selected to prevent sagging contact of the covering against said horizontal purlin, said chord being formed with a depth dimension in the radial direction to achieve the desired spacing between the covering and said horizontal purlin.

6. The drip stop spacer of claim 5 wherein the cross sectional configuration of the elongate chord in the direction of the depth dimension is an elongate "hour-glass" like configuration indented in the center and wider at the top and bottom.

7. The drip stop spacer of claim 6 wherein the depth dimension of the chord is greater than the width.

8. The drip stop spacer of claim 7, wherein the spacing between turns of the helix is selected to prevent contact of the covering against the purlin or spacer element for over 90% of the width of the covering along the purlin.

9. A greenhouse structure comprising:
frame members including horizontal purlins defining a greenhouse frame for supporting a greenhouse covering;
a greenhouse covering of flexible material secured over the frame; and
and at least one spacer element in the form of an elongate flexible cylindrical helix comprised of a flexible material helical chord wound around at least a portion of the horizontal purlins with helical chord depth dimension in the radial direction of the helix selected for spacing the greenhouse covering from said portion of horizontal purlins with lead or pitch spacing between turns of the helix selected to prevent sagging contact of the covering against said portion of the horizontal purlins for substantial reduction in purlin drip from condensation on the greenhouse covering.

10. The greenhouse structure of claim 9 wherein the flexible cylindrical helix is a molded elastic helix.

11. The greenhouse structure of claim 10 wherein the elastic helix is molded from plastic material.

12. The greenhouse structure of claim 9 wherein the lead or pitch spacing between turns of the helix is selected to prevent contact of said covering against portion of the horizontal purlins and the spacer element for at least 90% of the width of said covering along the length of said portion of horizontal purlins.

13. The greenhouse structure of claim 9 wherein the depth dimension of the chord is at least 3 times the maximum width of the chord.

* * * * *